United States Patent
Perez-Sanchez (10) Patent No.: US 7,425,103 B2
(45) Date of Patent: *Sep. 16, 2008

(54) JOINT FOR CONNECTING COMPONENTS TOGETHER ON OPPOSITE LONGITUDINAL SIDES IN ADDITION TO A FLEXIBLE STRIP USED FOR SAID JOINT

(75) Inventor: Juan Perez-Sanchez, Bad Aibling (DE)

(73) Assignee: Airbus Deutschland GmbH, Hamburg (DE)

(*) Notice: Subject to any disclaimer, the term of this patent is extended or adjusted under 35 U.S.C. 154(b) by 70 days.

This patent is subject to a terminal disclaimer.

(21) Appl. No.: 10/502,560

(22) PCT Filed: Jan. 20, 2003

(86) PCT No.: PCT/DE03/00142

§ 371 (c)(1),
(2), (4) Date: Mar. 2, 2005

(87) PCT Pub. No.: WO03/062052

PCT Pub. Date: Jul. 31, 2003

(65) Prior Publication Data

US 2005/0175399 A1      Aug. 11, 2005

(30) Foreign Application Priority Data

Jan. 22, 2002    (DE) .............................. 102 02 439

(51) Int. Cl.
F16C 11/04 (2006.01)
F16D 1/12 (2006.01)
E05C 1/00 (2006.01)
(52) U.S. Cl. .................... 403/121; 403/291; 16/227
(58) Field of Classification Search ............. 403/52, 403/72, 26, 150; 256/26; 416/23–24, 230; 16/225, 227

See application file for complete search history.

(56) References Cited

U.S. PATENT DOCUMENTS

| 661,346 A | 11/1900 | Lincoln |
| RE28,672 E | 1/1976 | Wakeman |
| 4,349,169 A | 9/1982 | McAnally |
| 4,843,679 A | 7/1989 | Maidment et al. |
| 5,019,007 A * | 5/1991 | Miller ..................... 446/62 |
| 5,048,585 A | 9/1991 | Miller |
| 5,158,388 A | 10/1992 | Ruf |
| 5,350,614 A | 9/1994 | Chase et al. |

(Continued)

FOREIGN PATENT DOCUMENTS

DE       2 309 567        8/1974

(Continued)

*Primary Examiner*—Daniel P. Stodola
*Assistant Examiner*—Nahid Amiri
(74) *Attorney, Agent, or Firm*—W. F. Fasse; W. G. Fasse (57) ABSTRACT

A joint for the connection of components (T1, T2) that are movable relative to one another, on respective longitudinal sides (L1, L2), includes at least two cooperating bands, which are secured with their first ends (E1) respectively on sides of the first component (T1) lying opposite one another and with their second ends (E2) respectively on sides of the second component (T2) lying opposite one another, so that the paths of the bands extend opposite one another in relation to the center axes (A1, A2) of the components.

14 Claims, 8 Drawing Sheets

U.S. PATENT DOCUMENTS

| | | | |
|---|---|---|---|
| 5,354,589 A | 10/1994 | Wass | |
| 5,463,794 A | 11/1995 | Erland | |
| 5,622,336 A * | 4/1997 | Chavanne et al. | 244/129.1 |
| 5,945,053 A | 8/1999 | Hettinga | |
| 6,010,098 A | 1/2000 | Campanile et al. | |
| 6,315,095 B1 * | 11/2001 | Garfinkle | 190/100 |
| 6,474,945 B1 * | 11/2002 | Nakasato et al. | 416/23 |
| 2005/0175406 A1 * | 8/2005 | Perez Sanchez | |

FOREIGN PATENT DOCUMENTS

| | | |
|---|---|---|
| DE | 28 07 648 | 9/1978 |
| DE | 40 37 774 | 4/1992 |
| EP | 0 860 355 | 8/1998 |
| EP | 1 085 152 | 3/2001 |
| GB | 2 184 281 | 6/1987 |
| RU | 2081788 | 6/1997 |

* cited by examiner

FIG.7

JOINT FOR CONNECTING COMPONENTS TOGETHER ON OPPOSITE LONGITUDINAL SIDES IN ADDITION TO A FLEXIBLE STRIP USED FOR SAID JOINT

CROSS-REFERENCE TO RELATED APPLICATION

This application is related to U.S. application Ser. No. 10/502,559 with a 35 USC 371(c) date of Mar. 2, 2005.

FIELD OF THE INVENTION

The invention relates to a joint for the connection of components, of which the longitudinal sides are facing toward one another, as well as flexible band for use for such a joint.

BACKGROUND INFORMATION

For improving the aerodynamic characteristics of wings, concepts for a wing with a variable profile that is adjustable via control mechanisms are known from the general state of the art. These concepts, however, use relatively many movable parts and joints, which mean a high effort and expense with respect to their fabrication and assembly.

For example, the U.S. Pat. No. 4,349,169 discloses a lifting wing with a profile that is variable by means of an actuator drive. Drive rods of the actuator drive are connected by means of joints with the structure of the lifting wing, whereby the axial direction of the joints extends in the span direction. Thereby, a profile variation is indeed possible, if plural actuator drives with corresponding operating rods are arranged one behind another as seen in the span direction. The profile shape variation disclosed therein, however, is achieved over the entire span direction in this arrangement.

Furthermore, from the EP 860,355, there is disclosed an aerodynamic component with variable camber, which is formed of articulately supported ribs with an outer belt and several stiffening struts that have a constant length and that engage on this outer belt. For deforming the component, the stiffening struts are operated by actuators in such a manner so that the stiffening struts move in the rib longitudinal direction or flow direction.

From the DE 28 07 648 C2, a foldable wall is known, with wall parts connected with one another through a fabric joint. The fabric joint is a band that is provided with a rim or edge rib on its longitudinal edges. The edge rib is held in a groove extending longitudinally along the side face of the wall part with a corresponding recess that is wider relative to the groove.

SUMMARY OF THE INVENTION

The object of the invention is to provide a joint that is simply constructed and simply installable, and represents an alternative to the presently utilized joints.

This object is achieved with the characterizing features of the independent patent claims. Further embodiments are set forth in the dependent claims.

According to the invention there is provided a joint for the connection of components that are movable relative to one another, on respective longitudinal sides with at least two cooperating joint-bands, which are secured with their first ends respectively on sides of the first component that are oriented opposite one another and with their second ends respectively on sides of the second component that are oriented opposite one another as well as opposite to the respective sides of the first component, with at least one pressure element arranged between the longitudinal sides. Preferably, the band is formed of at least two plies of a fiber-reinforced composite material or a different synthetic plastic or a textile material. The bands of the inventive joint can extend in their longitudinal direction at an angle β to the axial direction of the structure-joint, whereby the angle β amounts to equal or not equal to 90° for taking up shear forces that are to be transmitted through the joint.

BRIEF DESCRIPTION OF THE DRAWINGS

In the following, the invention is described in connection with the accompanying figures. It is shown by.

DETAILED DESCRIPTION OF EXAMPLE EMBODIMENTS OF THE INVENTION

Flexible joint-bands or bands or flexible straps or belt elements that are constructed of at least two layers or plies of a material, whereby the layers or plies are not fixed with one another in the free joint area FG, are used for the inventive joints for the jointed or articulated connection of two components that are movable relative to one another. In the following, that area or region that lies between the components that are connected with one another, that is to say is left vacant or blank by these components at least for producing the movability thereof, is understood as the free joint region or area FG. The free joint area FG is also that area of the bands, at which the bands of the joint do not lie in contact on the components in each of the prescribed positions thereof. In contrast, each flexible band provided according to the invention comprises a fixed area or region B, at which the band is secured to the respective component or is fixedly connected therewith. Areas or regions can also be included on these bands, which indeed lie in contact on the component or the components, but which are not fixed or secured thereto.

Figure 1:
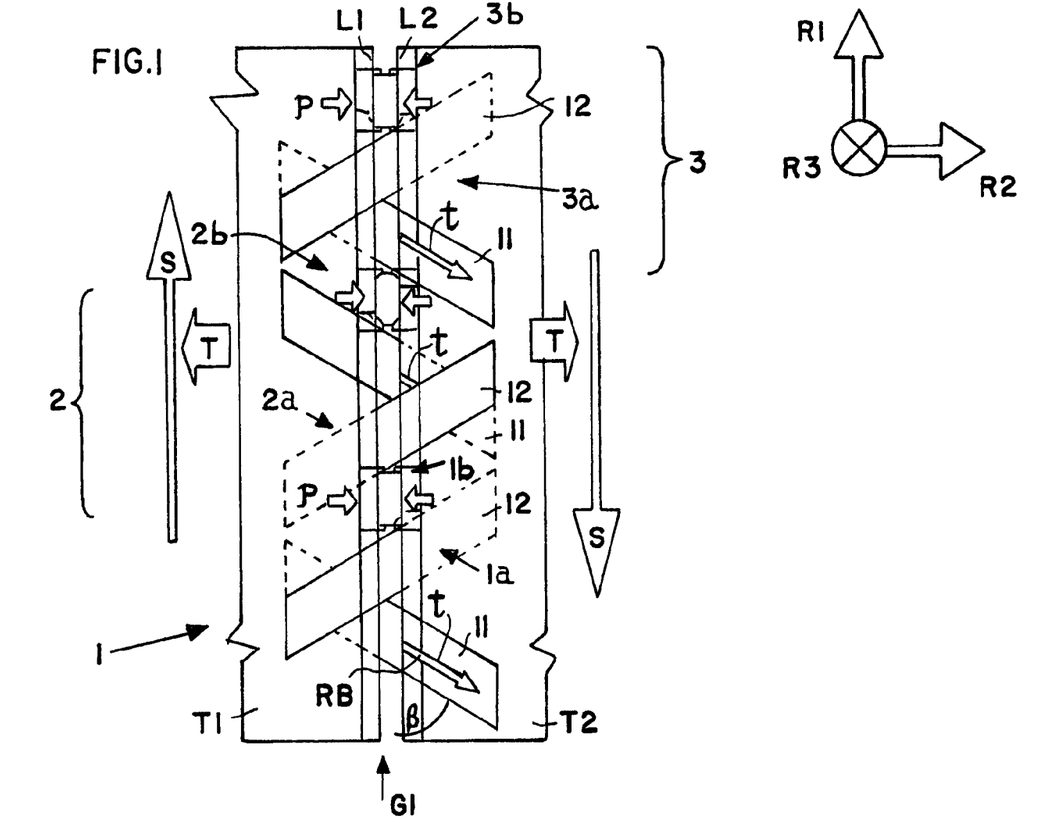
FIG. 1 a schematic illustration of an embodiment of the inventive joint in a top plan view, in which the kinetics and kinematics are entered in an arrow representation.
Figure 2:
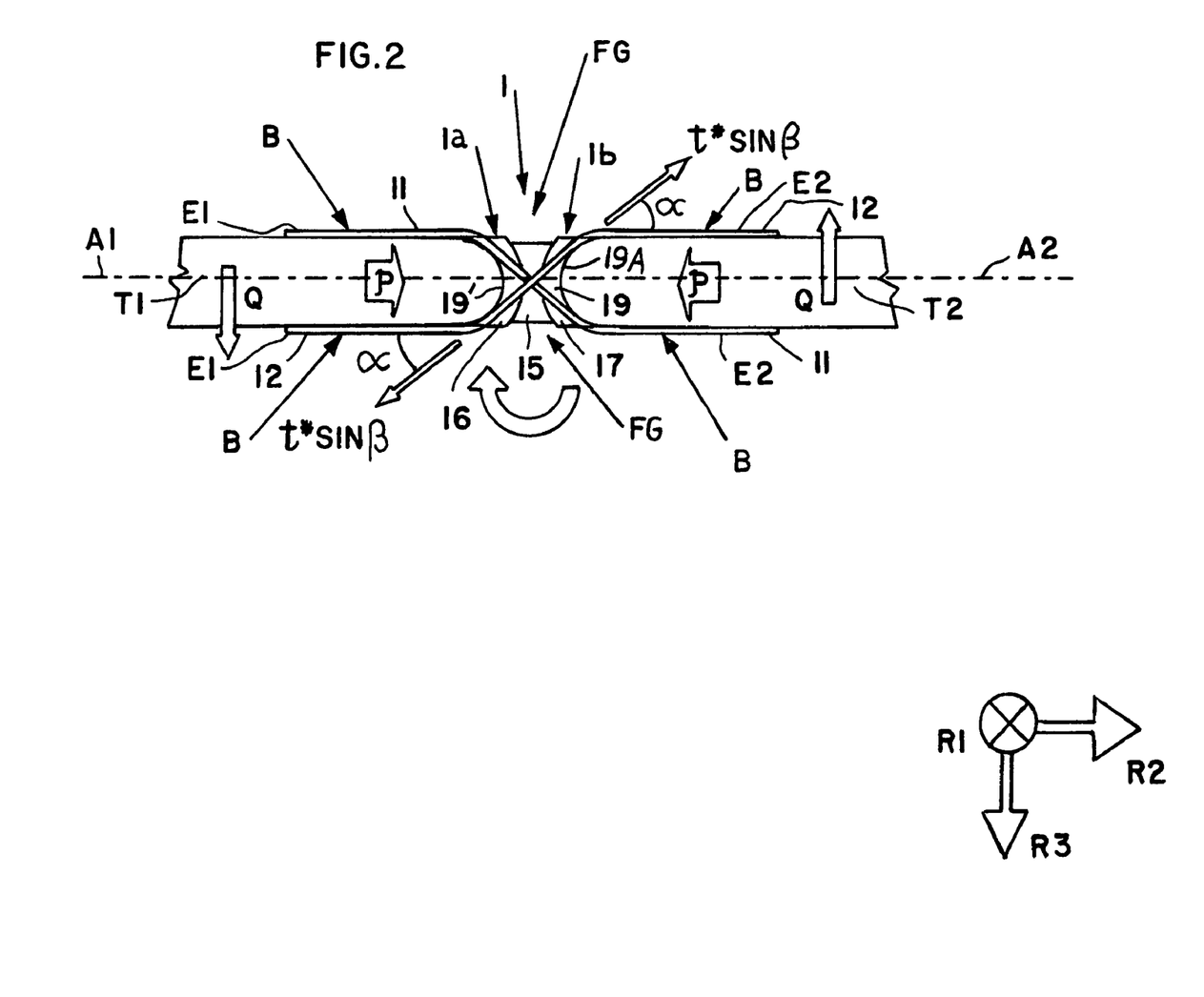
FIG. 2 the embodiment of the joint according to the FIG. 1, in section, with an arrow representation of the kinetics and kinematics.

In the embodiment of the joints or arrangements of such according to the FIGS. 1, 2 as well as 4, 5 and 6, the components T1, T2 that are articulately or jointedly connected with one another through the structure-joint are arranged one behind another with respect to their transverse direction R2 or on corresponding longitudinal sides L1, L2, that is to say, each component respectively lies in the extension of the component connected therewith via the joint. Thus, what is involved here is a joint for the connection of components of which the longitudinal sides are facing toward one another so that the components are connected with one another at edge or rim areas or ends via the joint. In that context, a first component T1 and a second component T2 can also be connected with one another via a joint G1 of plural inventive joint parts 1, 2, 3 that are functionally and structurally equivalent. According to the embodiment of the FIG. 1, each joint part 1, 2, 3 represents an inventive joint G1. The longitudinal direction of the components, to which the axial direction of the described joints or the longitudinal direction of the free joint area FG also corresponds, is referenced in the following with the reference character R1, the transverse direction of which is referenced with the reference character R2 and the thickness direction of which is referenced with the reference character R3.

Each joint G1 or each joint part 1, 2, 3 comprises at least one arrangement 1a, 2a or 3a of at least two flexible bands as well as at least one contact or pressure element 1b, 2b or 3b for receiving or taking up a pressure p exerted through the components on the pressure elements due to external forces S, T, Q and, if applicable, the tension force t exerted through the bands. The pressure element also serves for spacing apart the jointedly connected components.

The inventive joint is a structure-joint, because it can be formed, in its sub-parts, of materials that comprise similar characteristics as the components that are connected with this, so that the behavior of the joint corresponds to the behavior of the components even under the influence of forces or under tensions or stresses.

The structure-joint G1 illustrated in the FIG. 1 with the parts 1, 2, 3, will be described in the following with special reference to the joint part 1. In their neutral position, the components are arranged at an angle of 180 degrees relative to one another. According to the invention, however, the angle could also be not equal to 180 degrees.

The arrangement 1a of at least two bands 11, 12 is arranged offset relative to the at least one associated pressure element 1b with respect to the axial direction R1 in the free joint area FG. Also, one pressure element or plural pressure elements can be arranged between two bands. The bands are secured with a prescribed pretension on the components T1 and T2, in order to achieve a guidance of the components with simultaneous spacing-apart thereof. The bands extend in their longitudinal direction RB generally at an angle β relative to the longitudinal direction R1 of the component T1, T2 or relative to the course or extension of the joint axis corresponding to the longitudinal or axial direction R1. The angle β can lie between 90 degrees and almost 0 degrees, whereby the angle β is determined by the forces that are to be transmitted through the joint. The pressure element 1b effectuates a prescribed spacing-apart of the components T1 and T2, whereby the bands 11, 12 applied on the side surfaces of the components T1, T2 extend in the free joint area FG at a prescribed angle α relative to the transverse direction R2 of the components T1, T2. The relationships between the external forces and the tension forces t effective in the bands or pressure p effective on the pressure elements, which result from the angles α and β, are additionally entered or illustrated in the FIGS. 1 and 2. In that regard, it is assumed for the sake of simplification, that the same tension force t is effective in each participating band.

Particularly, the abovementioned relationships are given by $$p = t * \sin\beta * \cos\alpha$$

$$s = \Sigma t * \cos\beta$$

$$Q = \Sigma t * \sin\beta * \sin\alpha$$

wherein
p=pressure effective on the pressure elements
t=tension effective in the bands
S=external shear forces in axial direction R1
Q=external bending forces in thickness direction R3
β=angle of bands relative to axial direction R1
α=angle of bands through free joint area relative to transverse direction R2

According to the invention there is provided a joint or structure-joint for the connection of components T1, T2 that are movable relative to one another, on respective longitudinal sides L1, L2 with at least two cooperating bands, which are secured with their first ends E1 respectively on sides of the first component T1 that are oriented opposite one another and with their second ends E2 respectively on sides of the second component T2 that are oriented opposite one another as well as opposite to the respective sides of the first component, so that their courses or paths extend opposite one another with reference to the center axes A1, A2 of the components or that these intersect the longitudinal center axis of one of the components in opposite directions in the area between the components, with at least one pressure element arranged between the longitudinal sides for the guidance and spacing-apart of the components, whereby the bands, which lie behind one another as seen in the axial direction R1, extend crossed-over in the area FG between the components T1, T2 as seen in the axial direction R1. Especially, the components, in connection with the at least one pressure element, form, laterally adjacent thereto, one free joint area FG or two free joint areas, in which the bands respectively extend from one to the other component. Thereby, the bands can be arranged on one side of the pressure element or respectively one on both sides thereof. Preferably, two pressure elements are provided, in order to achieve a stable bearing support of the components T1, T2.

The pressure element 1b comprises at least one disk 15. At least one contact element 16 or 17 respectively can be arranged either on corresponding surfaces 19' of the components or on the sides of the disk 15 facing toward the longitudinal sides L1, L2, so that each contact element is positioned between the pressure element 1b and the respective component T1, T2. A contact element 16, 17 can especially comprise a gliding or sliding layer 19A, which is positioned on that surface 19 of the contact element that faces toward the respective component T1, T2. The pressure element and, if applicable, the contact element or the contact elements is or are held between the components T1 and T2 due to the tension of the bands. Alternatively or additionally, the pressure element can also be fixed or secured on one of the components—for example by means of adhesive or also securing means—if applicable also with a contact element lying therebetween.

Figure 3A:
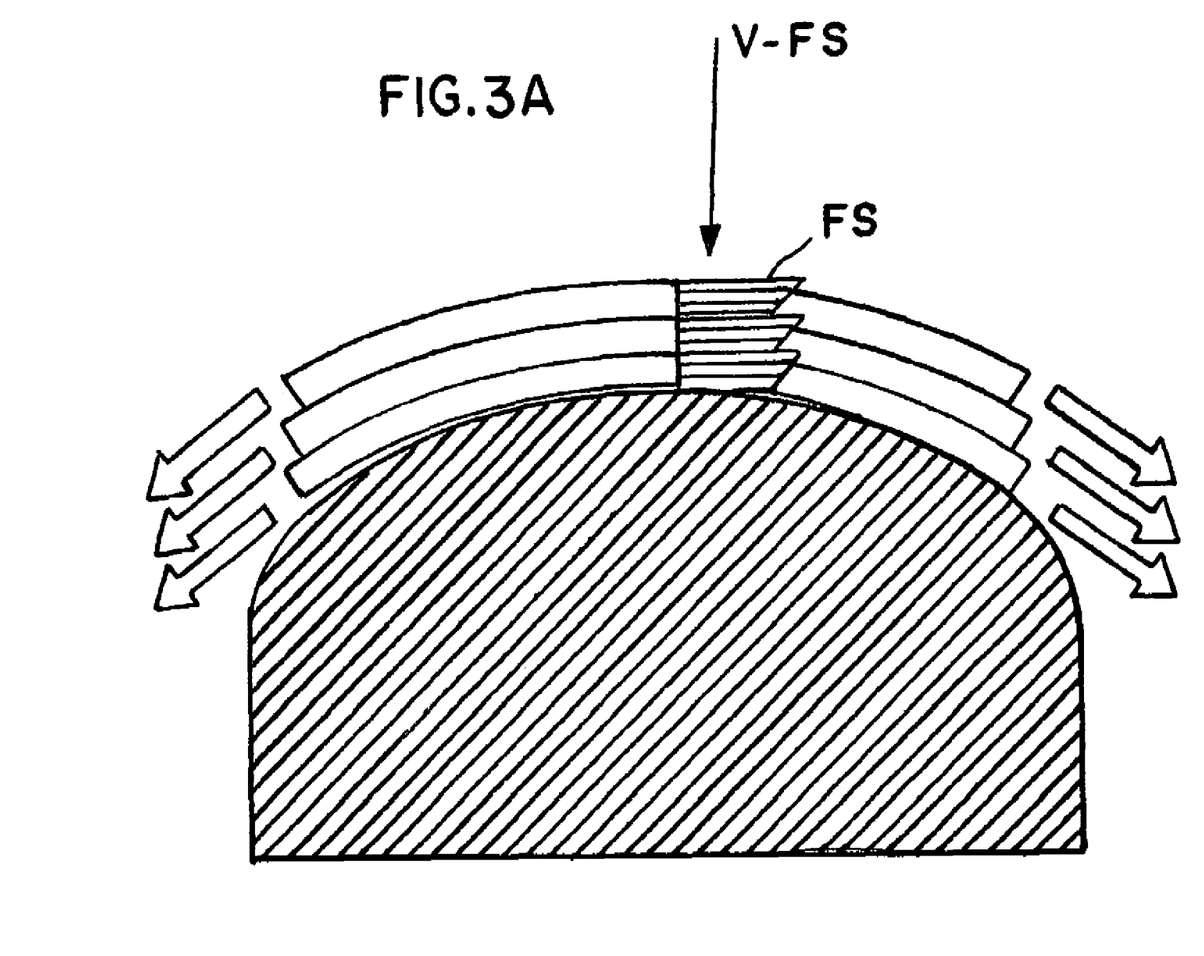
FIG. 3a a schematic illustration of the course or path of the shear force in the use of flexible bands for a joint, which is, according to the invention, not fixed but rather constructed as a woven web, for example.
Figure 3B:
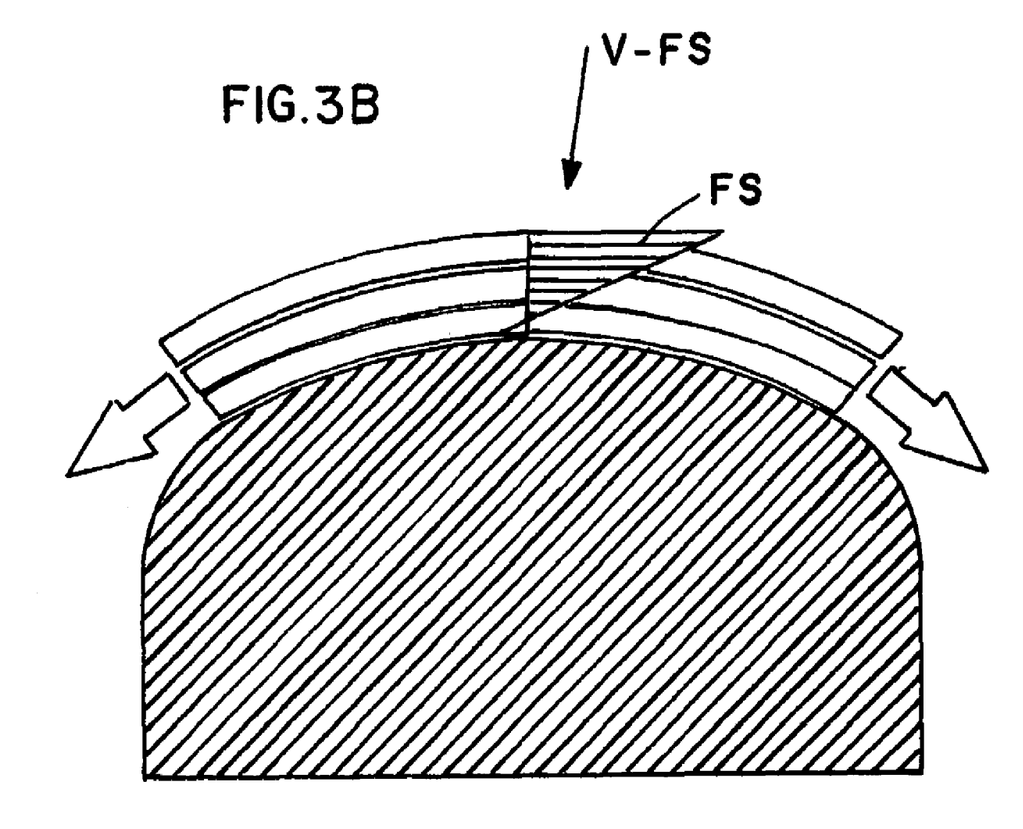
FIG. 3b a schematic illustration of the course or path of the shear force in the use of flexible bands for a joint, which is fixed in a matrix, thus for example in a resin layer.

A fiber-reinforced composite (FRC) material or a different synthetic plastic or a textile material or woven web is especially provided as the material for the bands used according to the invention. The provided bands are formed of at least two plies of the above referenced material. The plies are not fixed to one another in the area FG, thus in the region between the components T1, T2 that are to be connected with the joint, in order to keep the shear forces FS of the arising shear force path or course V-FS as small as possible (FIG. 3a). Otherwise, a disadvantageous course or path of shear forces FS would arise (FIG. 3b).

The fixing or securing of the bands on the respective component T1, T2 in their arrangement according to the FIGS. 1, 2 and 4, 5, 6 can be carried out according to the state of the art, thus for example through adhesive bonding, through securing elements, or through a melting fusion of the materials of the respective band with the respective component. The fixing or securing of the bands can additionally or alternatively also be carried out by means of clamping elements.

Figure 4:
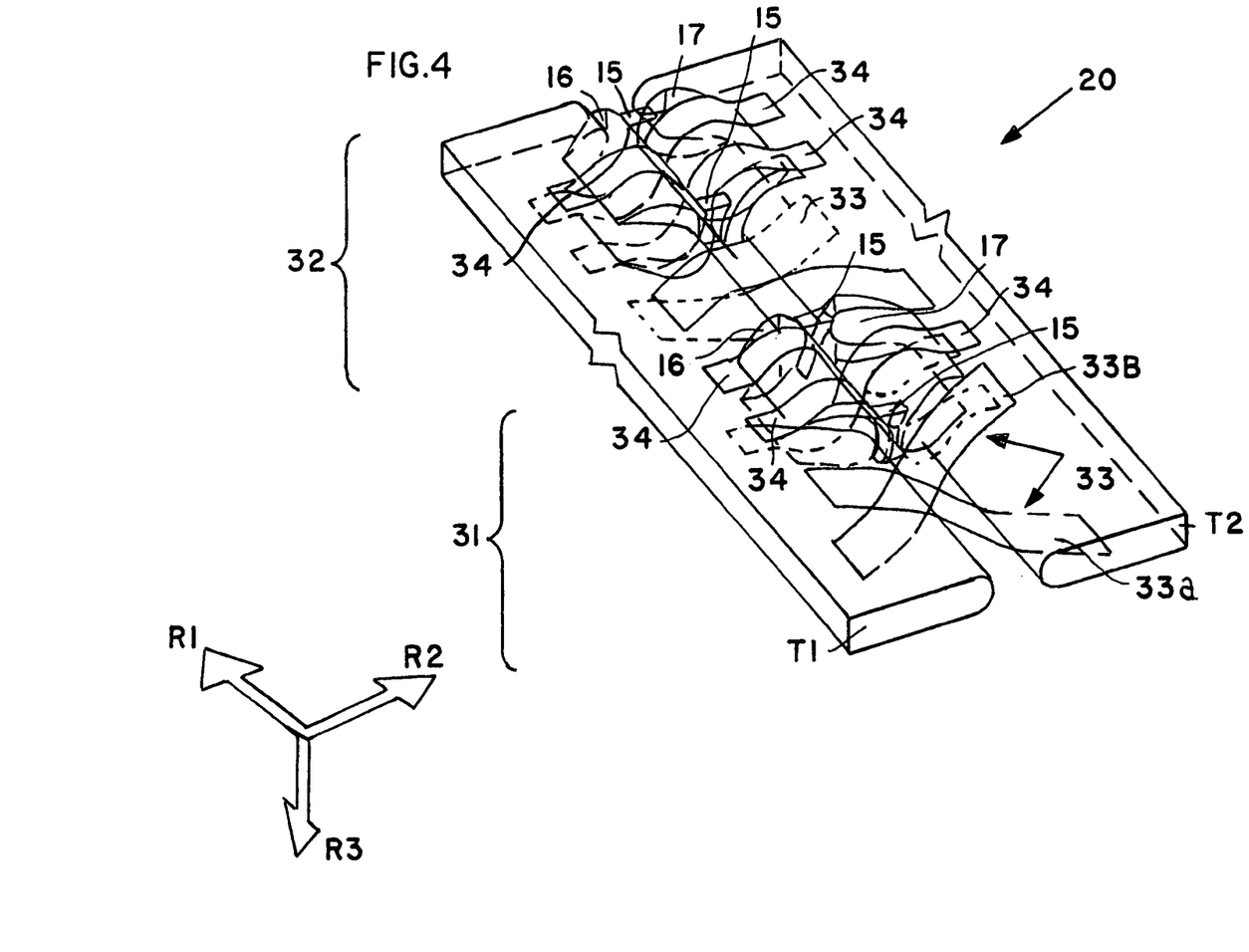
FIG. 4 a perspective illustration of the embodiment of the inventive joint according to the FIG. 1.

The FIG. 4 shows an arrangement 20 of plural inventive structure-joints 31 and 32, which can also be seen or considered as an individual inventive joint, whereby hidden lines are shown dashed and visible areas of the bands are shown by solid lines. The joints 31 and 32 comprise bands 33 or 33a, 33b, which are arranged at an angle β relative to the longitudinal or axial direction R1 of the components T1, T2 or at a complementary angle relative to the perpendicular onto the axial direction R1, whereby the angle β in the embodiment of the FIG. 4 is not equal to 90 degrees. Furthermore, the joints 31 and 32 respectively comprise three bands 34 or 34a, 34b, 34c, which extend in the direction R2 (angle β equal 90°). As seen in direction R2, pressure elements 1b, i.e. pressure element disks 15 with respectively two contact elements 16, 17 are arranged next to the bands 34. The surfaces of the contact elements 16, 17 facing toward one another or the corresponding surfaces of the pressure element disks 15 comprise larger radii of curvature than the surfaces of the components T1, T2 facing toward one another. Thereby, the compressive stresses arising on the pressure elements or the contact elements is reduced. The bands 33 lying next to the pressure elements without the use of contact elements essentially serve for maintaining a contact pressing force in the transverse directions R2 of the components onto the pressure element disks 15. In the areas in which the bands 34 are in a neighboring relationship with pressure element disks 15, the bands 34 also serve, due to their corresponding pre-stressing, additionally for the fixing of a prescribed maximum spacing distance between the components.

Figure 5:
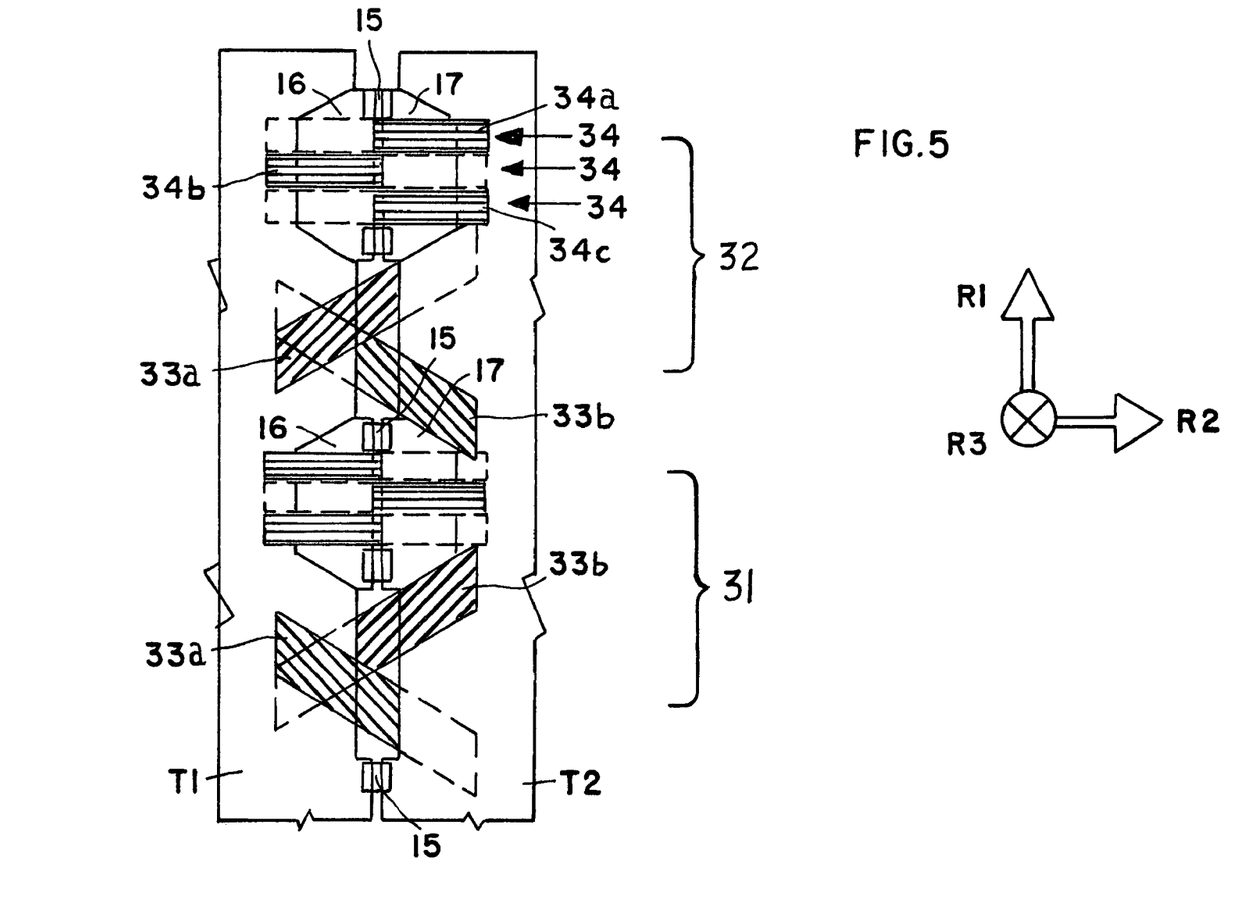
FIG. 5 a top plan view of the embodiment of the inventive joint according to the FIG. 4.
Figure 6:
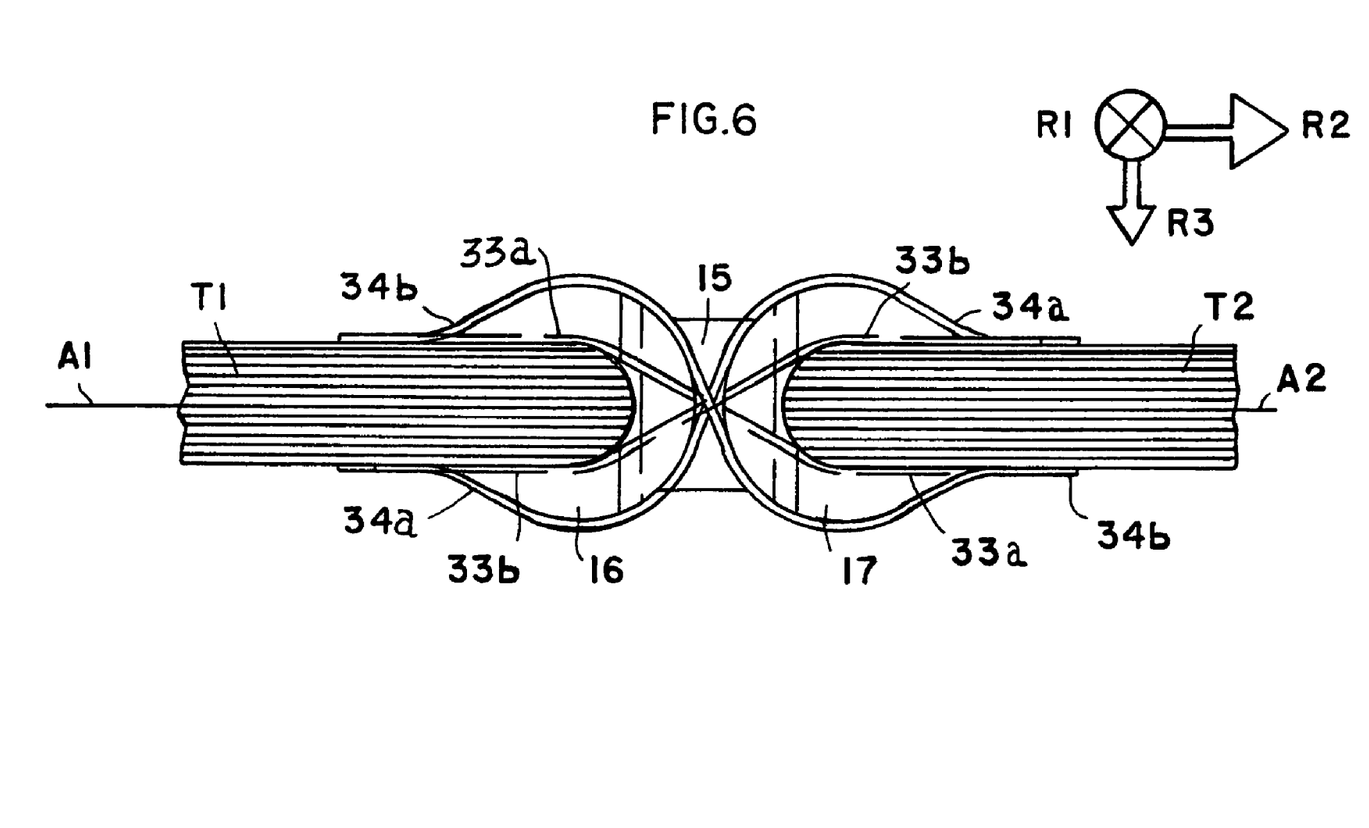
FIG. 6 a longitudinal section through the embodiment of the inventive joint according to the FIG. 4.

In embodiments of the structure-joint or an arrangement thereof for connecting two components T1, T2, also only one joint 31 or 32 can be used, as it is shown in the FIGS. 4 and 5. In each joint 31, 32, the bands 33 can also be arranged at an angle β equal to 90° without the use of contact elements. Alternatively, however, these may also be missing. The bands 34 with the use of contact elements can also be arranged at an angle β not equal to to 90°, whereby also only respectively two bands 34 can be provided per arrangement. It is essential in the inventive structure element, that at least two bands are arranged in connection at least with one pressure element. The sides of the pressure element facing toward the components, through the use of contact elements, can comprise a larger radius of curvature than the corresponding surfaces of the components, in order to reduce the arising compressive stresses.

The fixing or securing of the bands on the respective component T1, T2 in their arrangement according to the FIGS. 1, 2, 4, 5 or 6 can be carried out according to the state of the art, thus for example through adhesive bonding, through securing elements, or through a melting fusion of the materials of the respective band with the respective component.

Figure 7:
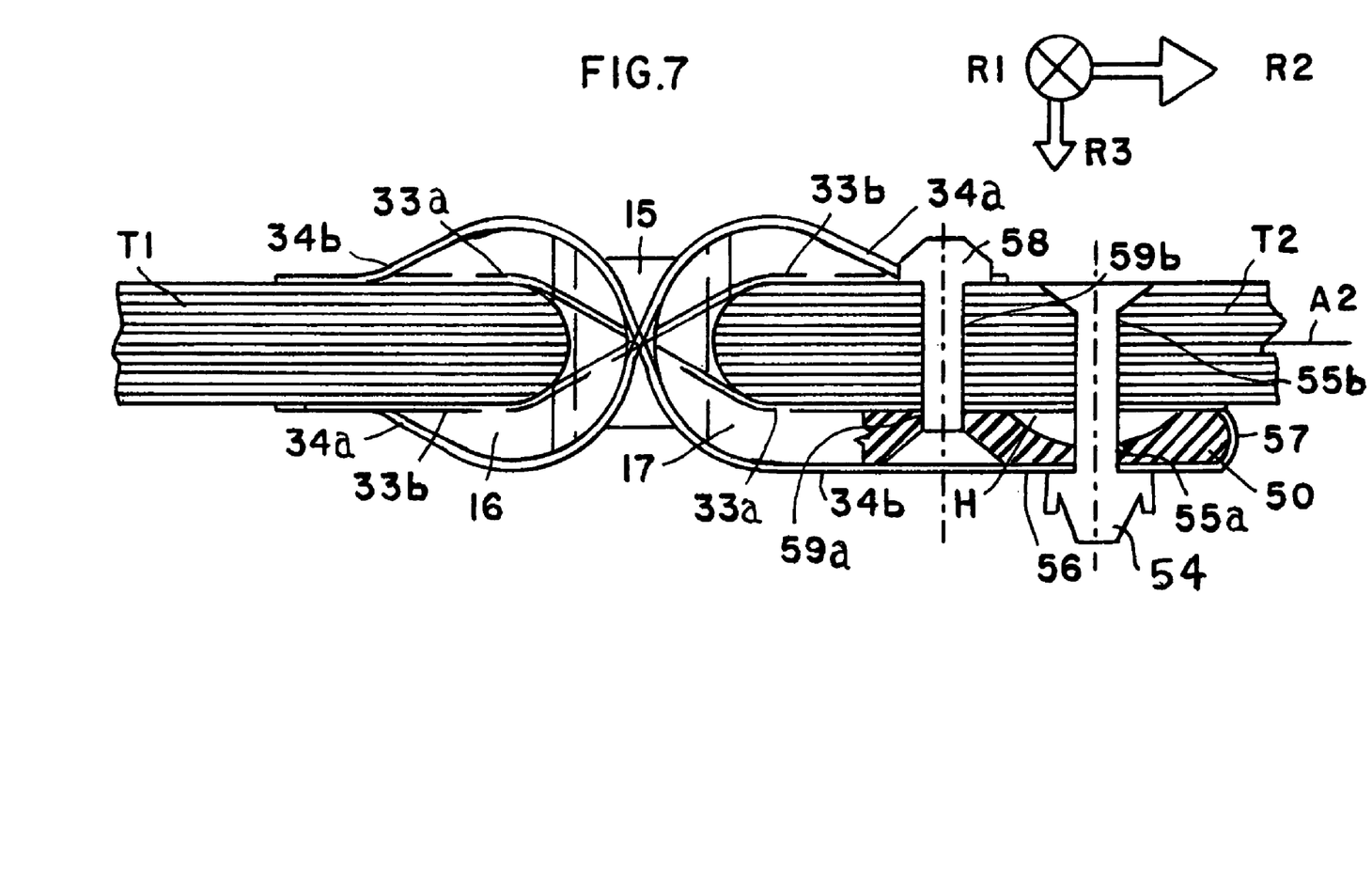
FIG. 7 a longitudinal section through a further embodiment of the inventive joint with a clamping element for fixing a flexible joint-band.

Alternatively or additionally, the securing of the bands on their second end E2 on the respective clamping element can be carried out by means of connection elements. In FIG. 7, there is shown, a securing or fixing of a joint-band on a clamping element 50 by means of at least one connection element 54 that extends transversely relative to the component T2 and the longitudinal axis A2 of the component T2 or of the clamping element 50, and that extends through the component T2, through the clamping element 50 and the section of the joint-band positioned between these. The band respectively secured on the clamping element preferably extends from the surface of the clamping element on the side facing away from the joint, around the same, and still in the area between the clamping element and the respective component (the component T2 in the FIG. 7). Preferably, the pertinent joint-band is thus guided or directed starting from the outer side 56 of the clamping element 50 facing away from the component T2 around the edge side or rim 57 lying opposite the component T1, until extending into the area between the clamping element and the component T2. The first connection element 54 thereby extends through an area of the band positioned between the clamping element 50 and the component T2. For that purpose, a corresponding bored hole 55a for receiving the first connection element 54 is arranged in the clamping element 50 and a bored hole 55b is provided in the component T2.

Preferably, a hollow space H is provided in the clamping element 50, through which the first connection element 54 extends. One end of the bored hole 55a is thus positioned in the hollow space H. The hollow space H is advantageously open toward the component T2. Through the hollow space H, during the tightening of the first connection element 54, the clamping element 50 is lengthened or stretched in the transverse direction R2 of the clamping element 50, thus in the longitudinal direction of the band, in order to tension or stress the pertinent band.

Advantageously, a second connection element 58 is provided close to the free joint area FG or close to the component T1. This second connection element 58 extends—like the first connection element 54—through the component T2, through an area of the flexible band positioned between the clamping element 50 and the component T1, through the clamping element 50, as well as through an area of the band positioned on the outer side 56 of the clamping element 50. For receiving the second connection element 58, a corresponding further bored hole 59a is arranged in the clamping element 50 and a bored hole 59b is provided in the component T2.

The band can be secured or clamped on a clamping element at only one of its ends. The securing or fixing can also take place on both ends of a band. One band or also plural bands can be clamped, fixed or secured with one clamping element.

The invention claimed is:

1. A joint arrangement comprising:
   first and second components (T1, T2) that are adjacent to one another along, and movable relative to one another about, respective longitudinal sides (L1, L2) of the first and second components facing toward one another to form a joint therebetween;
   at least two cooperating bands (11, 12; 33, 33a, 33b; 34, 34a, 34b), which are secured with respective first ends (E1) of the bands respectively on sides of the first component (T1) oriented opposite one another and with respective second ends (E2) of the bands respectively on sides of the second component (T2) oriented opposite one another as well as opposite to the respective sides of the first component, wherein the bands (11, 12; 33, 33a, 33b; 34, 34a, 34b) include first bands (11; 33a) and second bands (12; 33b) that extend opposite one another in respective longitudinal directions thereof at an angle β relative to an axial direction (R1) of the joint, whereby the angle β is greater than 0 degrees and less than 90 degrees for taking up shear forces that are to be transmitted between the first and second components through the bands;

at least one pressure element arranged between the longitudinal sides of the first and second components facing toward one another, wherein the at least one pressure element is arranged and adapted to space apart the longitudinal sides of the first and second components and to take-up and transmit pressure forces between the longitudinal sides of the first and second components; and a contact element (16, 17) arranged on a side of the pressure element facing toward one component of the first and second components (T1, T2).

2. The joint arrangement according to claim 1 wherein each one of the bands (11, 12; 33, 33a, 33b; 34, 34a, 34b) is formed of at least two plies of a fiber-reinforced composite material or a synthetic plastic or a textile material.

3. The joint arrangement according to claim 1, wherein the pressure element is fixed on one of the components (T1, T2).

4. The joint arrangement according to claim 1, wherein the contact element (16, 17) comprises a sliding layer on a surface of the pressure element that faces toward the one component.

5. The joint arrangement according to claim 1, wherein a side of the contact element (16, 17) facing toward the one component (T1) has a larger radius of curvature than a surface of the longitudinal side of the one component (T1), in order to reduce arising compressive stresses.

6. The joint arrangement according to claim 1, further comprising at least one clamping element that secures the bands (11, 12; 33, 33a, 33b; 34, 34a, 34b) to at least one of the components.

7. A joint arrangement comprising:

a first component and a second component, wherein said first component is arranged with a longitudinal edge thereof adjacent to and running along a longitudinal edge of said second component in a longitudinal joint axis direction, and wherein a joint area is formed between said longitudinal edge of said first component and said longitudinal edge of said second component;

a pressure element that is arranged in said joint area between said longitudinal edge of said first component and said longitudinal edge of said second component, and that is arranged and adapted to space apart and support said longitudinal edge of said first component relative to said longitudinal edge of said second component;

a contact element arranged on a side of said pressure element facing toward said first component;

a first band that has a first end portion thereof secured on a first side of said first component and has a second end portion thereof secured on a second side of said second component facing opposite said first side of said first component; and a second band that has a first end portion thereof secured on a second side of said first component opposite said first side of said first component, and has a second end portion thereof secured on a first side of said second component opposite said second side of said second component;

wherein respective third portions of said bands between said first and second end portions thereof respectively extend through said joint area between said longitudinal edges of said first and second components, wherein each one of said bands extends longitudinally in a sloping band direction at an angle greater than 0 degrees and less than 90 degrees relative to said longitudinal joint axis direction.

8. The joint arrangement according to claim 7, wherein said third portions of said bands extend through said joint area respectively at positions that are offset one behind another and offset from said pressure element in said longitudinal joint axis direction.

9. The joint arrangement according to claim 7, wherein said bands each respectively comprise at least two plies of one or more materials selected from the group consisting of fiber-reinforced composite materials, synthetic plastic materials, or textile materials.

10. The joint arrangement according to claim 9, wherein said at least two plies are not secured to one another respectively in said third portions of said bands extending through said joint area.

11. The joint arrangement according to claim 7, further comprising a clamping element secured to said second component, wherein said second end portion of said first band extends between said clamping element and said second side of said second component and around a side of said clamping element onto a surface of said clamping element facing away from said second component, and wherein said first band and said clamping element are secured to said second component by a securing element that passes through said second component, said clamping element, and said second end portion of said first band at a location between said clamping element and said second component and a location on said surface of said clamping element.

12. The joint arrangement according to claim 11, wherein said clamping element has a hollow space therein so that said clamping element is deformable by said securing element in a direction so as to apply a tension to said first band that is secured by said clamping element.

13. The joint arrangement according to claim 7, wherein said contact element comprises a sliding layer.

14. The joint arrangement according to claim 7, wherein said longitudinal edge of said first component has a first curved surface facing toward said contact element, said contact element has a second curved surface facing toward and contacting said first curved surface of said longitudinal edge of said first component, and said second curved surface has a larger radius of curvature than said first curved surface.

* * * * *